United States Patent [19]

Horvath et al.

[11] Patent Number: 4,668,933

[45] Date of Patent: May 26, 1987

[54] SERVO CONTROL MECHANISM

[75] Inventors: Peter Horvath; Rudolph Destics, both of Niles, Mich.

[73] Assignee: Tisza Industries, Inc., Niles, Mich.

[21] Appl. No.: 822,813

[22] Filed: Jan. 27, 1986

[51] Int. Cl.⁴ .......................................... H01C 10/16
[52] U.S. Cl. .................................... 338/134; 338/130
[58] Field of Search .............. 338/124, 131, 134, 128, 338/129, 130, 132, 133

[56] References Cited

U.S. PATENT DOCUMENTS 2,797,286 6/1957 Montgomery ...................... 338/126
3,373,393 3/1968 Hauenstine et al. ................ 338/134

Primary Examiner—E. A. Goldberg
Assistant Examiner—M. M. Lateef
Attorney, Agent, or Firm—Thomas J. Dodd

[57] ABSTRACT

An error detection device which includes two coaxial connected shafts. A flexible seal is disposed about one shaft to secure the shaft within a bore of the second shaft to insure accurate correlative movements of the shafts.

6 Claims, 4 Drawing Figures

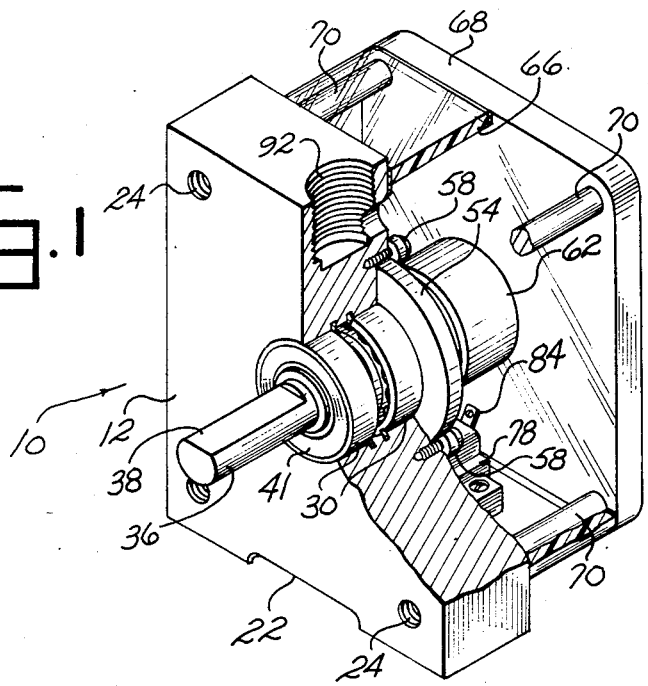
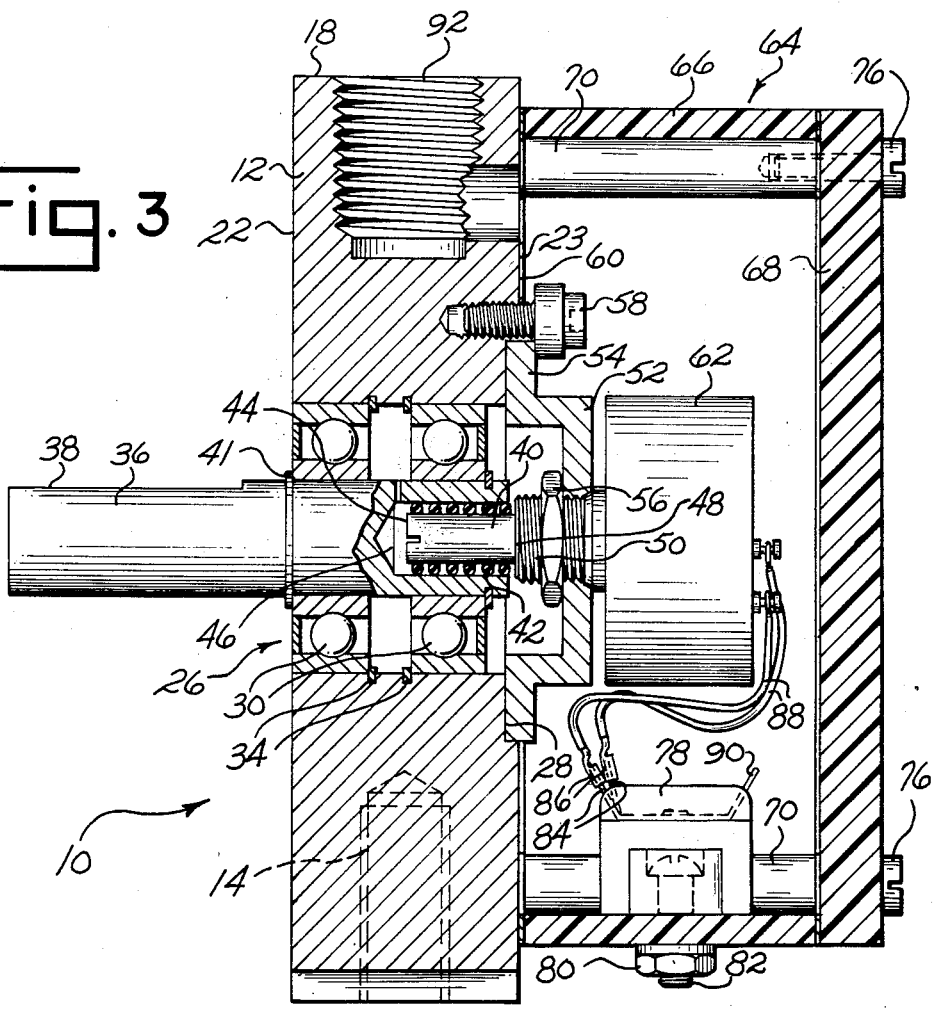

SERVO CONTROL MECHANISM

SUMMARY OF THE INVENTION

This invention relates to a servo control mechanism and will have application to an improved seal for a servo mechanism.

Servo mechanisms are well-known mechanical devices which are used to supplement the primary control device of a machine where precise movements are required. The servo mechanism will normally have a shaft which is connected to a part of a machine which is regulated. A regulating device such as a potentiometer or an encoder which senses voltage changes due to machine error is connected to the shaft. The regulating device transmits these changes to a servo motor where they are corrected.

Previously, the shaft of the servo mechanism was indirectly connected to the regulating device, creating problems with the bulk of the device and resulted in inefficient regulation. The servo mechanism of this invention includes a rotatable shaft secured to a stationary shaft which in turn is connected to the regulating device. A plurality of flexible O-rings seal the stationary shaft within the rotatable shaft to insure accurate regulation of the machine with minimal bulk.

Accordingly, it is an object of this invention to provide for a novel servo control mechanism.

Another object of this invention is to provide for a servo control mechanism having improved regulatory properties.

Another object of this invention is to provide an improved seal for the rotatable shaft of a servo mechanism.

Another object of this invention is to provide for a servo mechanism which will adapt to conventional regulating devices.

Other objects of this invention will become apparent upon a reading of the following description.

BRIEF DESCRIPTION OF THE DRAWINGS

A preferred embodiment of the invention has been depicted for purposes of illustration wherein:

FIG. 1 is a perspective view of the servo mechanism with portions cut away for purposes of illustration.

FIG. 3 is a sectional view taken along line 3—3 of FIG. 2.

DESCRIPTION OF THE PREFERRED EMBODIMENT

Figure 2:
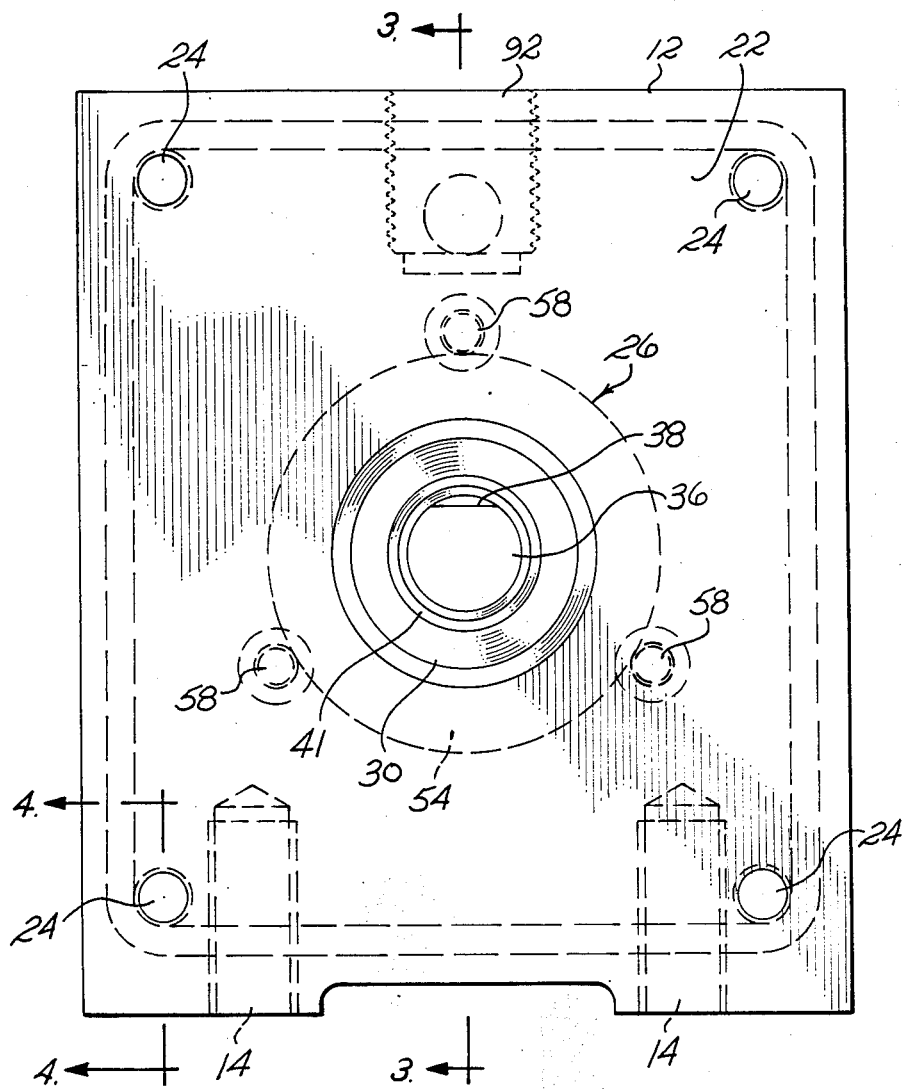
FIG. 2 is a bottom plan view of the servo mechanism.
Figure 4:
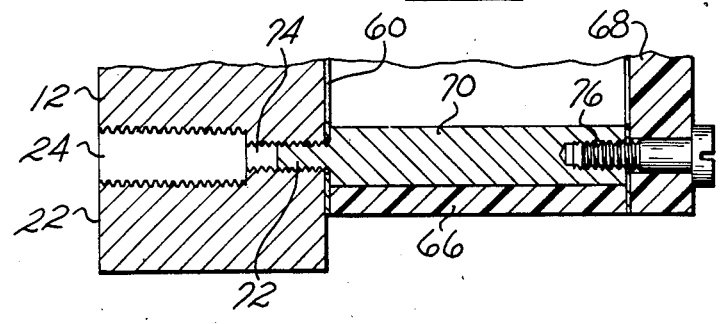
FIG. 4 is a fragmentary sectional view taken along line 4—4 of FIG. 2.

The preferred embodiment herein described is not intended to be exhaustive or to limit the invention to the precise form disclosed. It is chosen and described to explain the principles of the invention and its application and practical use to enable others skilled in the art to utilize the invention.

Servo mechanism 10 shown in the drawings includes a housing 12 formed of metal or similar durable material which has holes 14 formed in side face 20 of housing 12. Housing end face 22 includes a plurality of tapped holes 24. Housing 12 includes a central bore 26 extending from end face 22 to end face 23 of the housing. A guide shoulder 28 is formed in housing end face 23 and circumscribes bore 26.

Ball bearings 30 are fitted restrictively within housing bore 26 and are secured therein by retainer rings 34. A shaft 36 is rotatably positioned in bearing opening 32 and extends beyond housing end face 22. Shaft 36 is secured between bearings 30 by retainers 41 and may include a notch or spline 38 to allow the shaft to be connected to a machine (not shown). A shaft 40 which is circumscribed by flexible O-rings 42 is fitted restrictively at one end 44 within a bore 46 of shaft 36. Shaft 40 is connected at its other end 48 to a threaded bushing 50.

An adaptor disc 52 circumscribes bushing 50 and includes downturned offset foot 54 which is positioned in guide shoulder 28. A nut 56 secures disc 52 in the position shown in FIG. 3. A plurality of screws 58 are threaded into housing 12 and secure disc foot 54 within guide shoulder 28. A gasket 60 overlies housing end face 23. An electrical sensing device such as potentiometer or encoder 62 is connected to bushing 50 and communicates with shaft 40.

An enclosure 64 having a side wall 66 and a cover plate 68 overlies housing 12 at the housing peripheral edge. A plurality of spacers 70 are secured to side wall 66 as by gluing and include a male coupler 72 which is fitted into compatible female coupler 74 formed in housing face 23. Spacers 70 are secured to cover plate 68 by fasteners, such as screws 76. Both side wall 66 and cover plate 68 may be formed of transparent plastic material.

An electrical terminal block 78 is fastened to enclosure side wall 66 by a nut 80 and bolt 82 as shown in FIG. 3. Terminal block 78 includes quick connect lugs 84 which allow coupling of sensing device 62 to the terminal block by wires 88 which have quick connect fasteners 86. A second set of lugs 90 are provided in terminal block 78 which allow electrical connection between the servo mechanism 10 to a correction device (not shown) through wires (not shown) passed through NPT bore 92 to the correction device.

Servo mechanism 10 operates as follows. Housing 12 is mounted onto a machine by inserting fasteners (not shown) through the machine wall and holes 14 for a "foot" type mount or by inserting fasteners through the machine and tapped holes 24 for a "face" mount. Shaft 36 is positioned restrictively within the machine error detection bore. If the machine (such as a radar antenna requiring precise movement) is functioning properly, the shaft 36 will remain stationary. If there is ever a shift from the machine's preprogrammed movement pattern, shaft 36 rotates and causes a voltage drop across sensing device 62. This drop is amplified and then relayed to a correction device such as a servo motor (not shown) which corrects the error. Due to the restrictive fit between shafts 36 and 40, accurate error transmission is effected which allows precise movement of the machine to be maintained.

It is understood that the above description does not limit the invention to the precise form disclosed, which may be modified within the scope of the appended claims.

We claim:

1. A servo mechanism comprising a housing, a first shaft positioned in and extending outwardly of said housing, said first shaft adapted for connection to a machine, a second shaft having a first end restrictively fitted in said first shaft, said second shaft including a second end connected to a sensing member, and a flexible coupling disposed about said second shaft within said first shaft wherein rotation of said first shaft effects corresponding rotation of said second shaft to transmit a signal to said sensing member.

2. The servo mechanism of claim 1 wherein said first shaft includes a bore, said second shaft restrictively fitted within said bore, said seal circumscribing said second shaft within said bore.

3. The servo mechanism of claim 1 wherein said housing includes a bore therethrough, ball bearing means positioned restrictively within said housing bore for facilitating rotative movement of said first shaft, said first shaft restrictively positioned in said housing bore against said bearing.

4. The servo mechanism of claim 3 and a retainer positioned adjacent said bearing means and circumscribing said first shaft, said retainer constituting means for preventing axial movement of said first shaft.

5. The servo mechanism of claim 1 wherein said seal includes a plurality of flexible O-rings circumscribing said second shaft.

6. The servo mechanism of claim 1 and a disc having offset portions circumscribing said second shaft, said housing including a guide shoulder therein, said disc offset portions fitted within said guide shoulder, and fastening means for securing said disc within said guide shoulder.

* * * * *